(12) United States Patent
Deyaf et al.

(10) Patent No.: US 12,087,161 B1
(45) Date of Patent: Sep. 10, 2024

(54) SMART EMERGENCY VEHICLE SIREN PROVIDING DIGITAL ACTIVATION ALERTS

(71) Applicant: Feniex Industries, Austin, TX (US)

(72) Inventors: Hamza Deyaf, Austin, TX (US); Kyle Hale, Austin, TX (US); Nicholas Cameron Marth, Austin, TX (US); Aaron Brown, Austin, TX (US); Geoffrey Salazar, Cedar Park, TX (US); Tom Duong, McMahan, TX (US)

(73) Assignee: Feniex Industries, Austin, TX (US)

( * ) Notice: Subject to any disclaimer, the term of this patent is extended or adjusted under 35 U.S.C. 154(b) by 0 days.

(21) Appl. No.: 18/479,744

(22) Filed: Oct. 2, 2023

(51) Int. Cl.
| | |
|---|---|
| *G08G 1/0967* | (2006.01) |
| *B60Q 1/52* | (2006.01) |
| *B60Q 5/00* | (2006.01) |
| *G08G 1/0965* | (2006.01) |
| *G08G 1/127* | (2006.01) |
| *G08G 1/133* | (2006.01) |

(52) U.S. Cl.
CPC ......... *G08G 1/096791* (2013.01); *B60Q 1/52* (2013.01); *B60Q 5/005* (2013.01); *G08G 1/0965* (2013.01); *G08G 1/127* (2013.01); *G08G 1/133* (2013.01)

(58) Field of Classification Search
CPC ........... G08G 1/096791; G08G 1/0965; G08G 1/127; G08G 1/133; B60Q 1/52; B60Q 5/005
See application file for complete search history.

(56) References Cited

U.S. PATENT DOCUMENTS

| | | | | |
|---|---|---|---|---|
| 6,958,707 | B1* | 10/2005 | Siegel | G08G 1/087 340/902 |
| 8,842,021 | B2* | 9/2014 | Behm | G08G 1/0969 340/988 |
| 10,008,111 | B1* | 6/2018 | Grant | G08G 1/166 |
| 10,565,873 | B1* | 2/2020 | Christensen | G08G 1/0965 |
| 2001/0038344 | A1* | 11/2001 | Garcia | G08G 1/0965 340/904 |
| 2003/0141990 | A1* | 7/2003 | Coon | G08G 1/0965 340/988 |
| 2004/0246144 | A1* | 12/2004 | Siegel | G08G 1/0965 340/902 |
| 2006/0255966 | A1* | 11/2006 | McKenna | G08G 1/0965 340/902 |

(Continued)

*Primary Examiner* — Dale W Hilgendorf
(74) *Attorney, Agent, or Firm* — Foley IP Law, PLLC

(57) ABSTRACT

Examples provide digital alerts associated with activation of a smart siren device of an emergency vehicle. An alert manager provides digital alerts to recipients when a smart siren device is turned on. The alert manager identifies any recipients within range of the smart siren device. The alert manager generates a notification including notification data. The notification is transmitted to one or more recipients within range of the emergency siren device. The notification data is used to generate a digital alert, which is presented to a user via a user interface device or other output device. The system determines when to provide digital alerts by applying user-configurable rules to notification data for customizable digital alerts to selected recipients. The digital alerts can include emergency vehicle indicators identifying the location of emergency vehicles having activated emergency sirens within digital maps displayed to users in vehicles.

19 Claims, 14 Drawing Sheets

(56) References Cited

U.S. PATENT DOCUMENTS

| | | | |
|---|---|---|---|
| 2007/0159354 A1* | 7/2007 | Rosenberg | G08G 1/0965 340/902 |
| 2010/0250111 A1* | 9/2010 | Gutierrez | G01C 21/3697 701/532 |
| 2011/0018736 A1* | 1/2011 | Carr | G08G 1/0965 340/902 |
| 2011/0181443 A1* | 7/2011 | Gutierrez | G01C 21/3697 340/990 |
| 2012/0313792 A1* | 12/2012 | Behm | G08G 1/0962 340/902 |
| 2014/0085107 A1* | 3/2014 | Gutierrez | G08G 1/096775 340/905 |
| 2018/0268690 A1* | 9/2018 | Gebers | G08G 1/163 |
| 2019/0027032 A1* | 1/2019 | Arunachalam | G08G 1/0965 |
| 2021/0212158 A1* | 7/2021 | Robertson, II | H04W 4/021 |

* cited by examiner

SMART EMERGENCY VEHICLE SIREN PROVIDING DIGITAL ACTIVATION ALERTS

BACKGROUND

An emergency vehicle frequently utilizes audible alerts emitted by sirens and horns to warn drivers that the emergency vehicle is nearby and responding to an emergency event, such as, but not limited to, a firetruck responding to a fire and/or an ambulance responding to a medical emergency. Emergency vehicle sirens are designed to emit sounds intended to warn motorists and pedestrians. However, some people may fail to hear the sirens due to a hearing impairment and/or distracting ambient sounds, such as radios, construction sounds, traffic noise, train horns, storm sounds, etc. Emergency warning lights may be used in combination with sirens, such as, but not limited to, light emitting diode (LED) lightbars on the roof of emergency vehicles which flash combinations of colors, such as red, blue, amber, white, and/or green lights. However, these lights may also go unnoticed where the driver is not looking in the direction of the emergency vehicle. Moreover, emergency lights fail to provide adequate warning before the driver is within visual range of the emergency vehicle. In such cases, visual and audible alerts may be insufficient to notify users of the presence of emergency vehicles in the vicinity of drivers and/or pedestrians.

SUMMARY

Some examples provide a system for providing digital alerts associated with emergency siren activations. The system includes a set of speakers and a siren controller device. The siren controller device includes a network device; a processor; and a memory communicatively coupled to the processor. An alert manager detects a change in the activation state of the smart siren device from a de-activated state to an activated state. The smart siren device emits one or more sounds associated with a selected audible alert type when the smart siren device is in the activated state. The alert manager generates a notification identifying the current location of the emergency vehicle if the siren device is activated. The notification includes data associated with the siren activation, such as, the current location of the emergency vehicle. The alert manager provides the notification to a remote computing device via the network device. A digital alert is generated on a user interface device associated with a recipient vehicle within a predetermined range of the emergency vehicle using the notification data. The digital alert includes the current location of the emergency vehicle.

Other examples provide a method for providing digital alerts associated with emergency siren activations. The alert manager detects a change in activation state of a smart siren device from an un-activated state to an activated state when the siren device is turned on. The alert manager determines whether the emergency vehicle is in motion. The alert manager generates a notification identifying the current location of the emergency vehicle if the emergency vehicle is in motion and the smart siren device is in the activated state. The alert manager provides the notification to at least one selected recipient via a network device. A digital alert is generated using the notification data. The digital alert is presented via a user interface device associated with a recipient vehicle within the predetermined range of the emergency vehicle.

Still other examples provide a computer storage device having computer-executable instructions stored thereon. The instructions cause a computing device to detect a change in activation state of a smart siren device associated with an emergency vehicle from a de-activated state to an activated state. The system generates a notification identifying the current location of the emergency vehicle responsive to determining the siren device is in the activated state. The system provides the notification to a computing device associated with a recipient user. The computing device generates a digital alert based on the notification. The digital alert is presented to the recipient user via a user interface device associated with the computing device. The digital alert includes the current location of the emergency vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
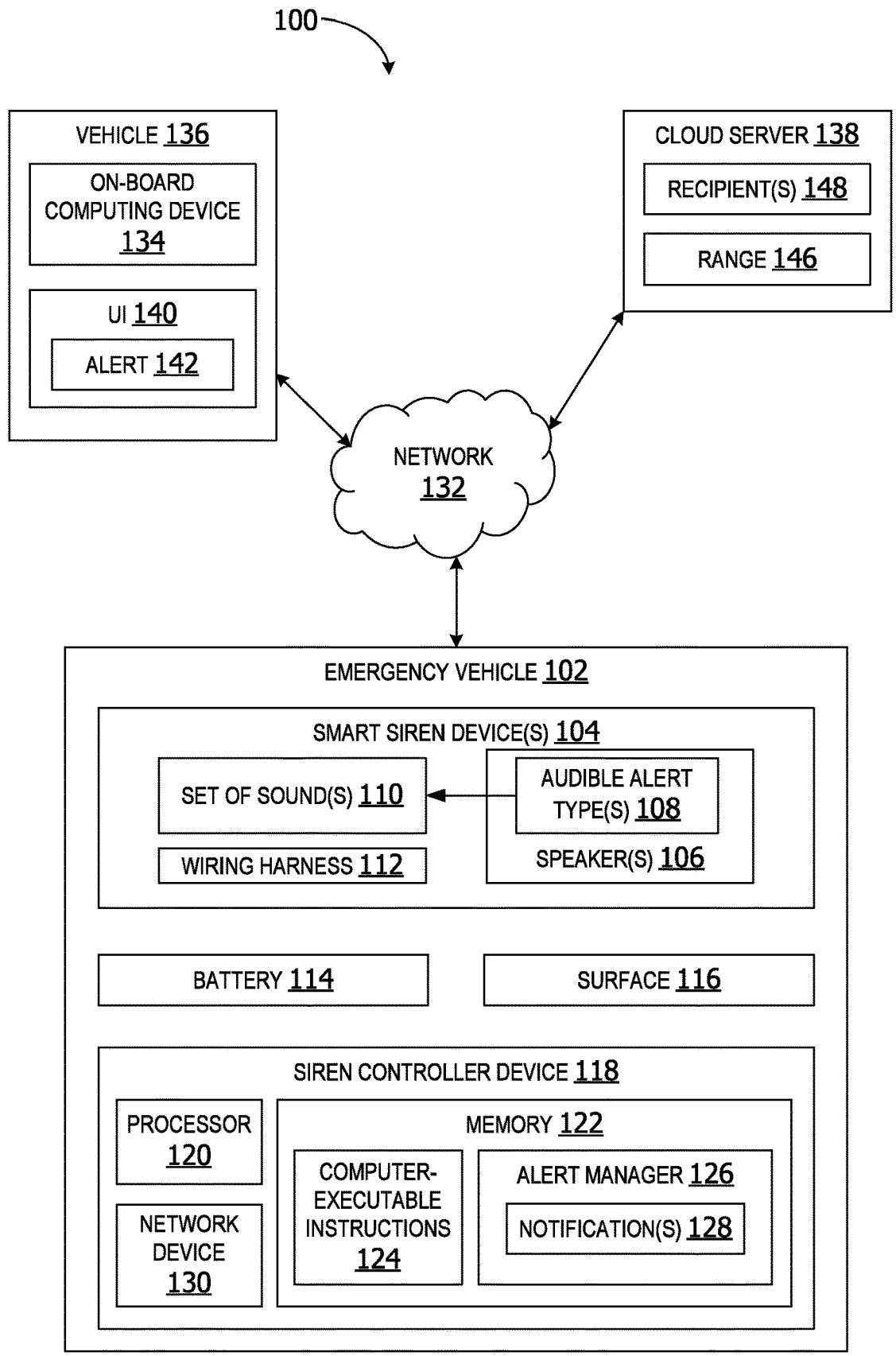
FIG. 1 is an exemplary block diagram illustrating a system for generating digital alerts associated with smart siren device activation.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . ." For brevity and clarity of presentation, this implied leading clause is not repeated ad nauseum.

Emergency vehicles typically alert drivers of other vehicles in their vicinity of the presence of the emergency vehicles responding to emergency situations audible and/or visual alerts provided via sirens and/or emergency warning lights on the vehicle. However, these visual and audible alerts are becoming less effective at providing warning to drivers where these devices are competing with navigation applications, music, podcasts, roadside digital billboards, and other information sources for the drivers' attention.

Referring to the figures, examples of the disclosure enable digital alerts to recipient users, such as drivers of vehicles within the vicinity of an emergency vehicle having the siren activated indicating the emergency vehicle is responding to an emergency or other potentially hazardous event. The digital alerts are presented to the recipient in such a manner that supplements the audible and/or visual alerts provided by the sirens and emergency warning lights. The digital alerts are presented to the driver via a user interface which improves emergency vehicle response time, reduces the occurrence of accidents, improves safety for other drivers, and increases the number of drivers responding to the presence of emergency vehicles on roadways, such as by encouraging more non-emergency vehicles to pull over to the side of the road enabling emergency vehicles to pass by safely and quickly on the roadway without accidents.

In some examples, an alert manager generates a notification when a smart siren device of an emergency vehicle is activated. The alert manager includes the current location of the emergency vehicle in the notification. The notification is provided to a computing device associated with a designated recipient, such as, but not limited to, a cloud server, an on-board computing device within a vehicle and/or a user device associated with a driver or other user. The computing device generates a digital alert, including the current location of the emergency vehicle. The digital alert is presented to the user via a user interface device. This provides a digital warning to the user in addition to the audible alert provided by the smart siren device(s) on the emergency vehicle. In this manner, if a driver or passenger in a vehicle fails to hear the audible alert provided by the siren, the system provides a digital alert to ensure all drivers are aware of an emergency vehicle within a vicinity of the drivers. This provides additional security and safety for the emergency vehicles and non-emergency vehicles within range of the emergency vehicles. Moreover, the digital alerts reduce the number of traffic accidents while enabling faster response times for emergency vehicles.

In other examples, the system provides a siren controller device associated with the smart siren which monitors activation and de-activation of the sirens on an emergency vehicle. The siren controller device generates a notification including the current location of the emergency vehicle when one or more sirens are turned on. The siren controller device transmits the notification with the current location data of the emergency vehicle to other vehicles and/or user devices within a predetermined range of the emergency vehicle. In this manner, user is provided with visual alerts via the light devices, audible alerts via the emergency vehicle sirens, and digital alerts via the on-board vehicle computing devices and/or user devices within vehicles located within a given range of the emergency vehicle for improved safety, prevention of traffic jams, and smoother traffic flow on roadways where emergency vehicles may be stationary or in motion on roadways.

The smart siren device of an emergency vehicle operates in an unconventional manner by monitoring siren activation and notifying recipients via computing devices associated with the recipients within range of the activated smart siren device. In this manner, the smart siren device is used in an unconventional way and allows provision of real-time digital alerts to other emergency vehicles as well as non-emergency vehicles within range of smart siren device, thereby improving the ability of emergency vehicles to alert other vehicles of their presence during an emergency.

Referring again to FIG. 1, an exemplary block diagram illustrates system 100 for generating digital alert notifications associated with smart siren device activation. The digital alert notification is transmitted to recipient computing systems which use the digital alert notification data to generate digital alerts, which are presented to one or more recipients.

In some examples, an emergency vehicle 102 includes a set of smart siren device(s) 104. The emergency vehicle 102 is any type of vehicle having one or more smart siren devices. The emergency vehicle is a vehicle used to respond to an emergency event, render aide, or otherwise provide services, such as, but not limited to, vehicles utilized by construction workers, utility workers, repair crews, and other service providers working in hazardous conditions.

The emergency vehicle 102 is implemented as any type of vehicle, such as road vehicles, off-road vehicles, boats, helicopters, and/or amphibious vehicles. Emergency vehicle 102 includes both marked and unmarked vehicles. The emergency vehicle 102 is implemented as any type of emergency vehicle, such as, but not limited to, police cars, highway patrol vehicles, police motorcycles, firetrucks, ambulances, tow trucks, search and rescue vehicles, utility vehicles, construction vehicles, etc.

The emergency vehicle 102 includes one or more smart siren device(s) 104 including a set of one or more speaker(s) 106 capable of generating one or more audible alert type(s) 108. An audible alert type is a type of alert. The audible alert type(s) 108 includes one or more types of sounds or combination of sounds creating a distinct sound. The audible alert types include, for example, a wail, yelp, hi-lo, piercer, power call, air horn, howler, phaser, as well as any other type of siren sound. Thus, the speaker(s) 106 generates a set of sound(s) 110 consistent with a selected audible alert type.

For example, if the selected audible alert type is air horn, the speaker(s) generate a set of sounds including air horn sounds. In another example, if the audible alert type is wail, the speaker(s) 106 produces the set of sound(s) 110 including longer, drawn out wailing sounds.

A smart siren device in the one or more smart siren device(s) 104 is capable of producing sound(s) in one or more alert types providing audible warning that an emergency vehicle is responding to a potential emergency situation or hazardous condition. The smart siren device may be referred to as an emergency siren device, a warning siren device, and/or a surface mounted siren device on an emergency vehicle.

The smart siren device(s) 104 are connected to a power source via a wiring harness 112. The wiring harness 112 provides electrical power to the smart siren device(s) 104 from the power source. The power source, in this example, is a vehicle battery 114. In other examples, the power source optionally includes solar panel(s) for generating solar power or any other available power source associated with the emergency vehicle 102. The solar panel(s) may be mounted to a surface 116 of the emergency vehicle 102.

The siren controller device 118 has at least one processor 120 and a memory 122. The processor 120 includes any quantity of processing units and is programmed to execute computer-executable instructions 124. Computer-executable instructions 124 is performed by processor 120, performed by multiple processors within the siren controller device 118 or performed by a processor external to the siren controller device 118. In some examples, the processor 120 is programmed to execute instructions such as those illustrated in the figures (e.g., FIG. 13 and FIG. 14).

The memory 122 includes any quantity of computer-readable media associated with or accessible by the siren controller device 118. The memory 122 in these examples is internal to the siren controller device 118 (as shown in FIG. 1). In other examples, the memory 122 is external to the siren controller device 118 (not shown) or both (not shown).

The memory 122 stores data, such as one or more applications. The applications, when executed by processor 120, operate to perform functionality on siren controller device 118 and/or the smart siren device(s) 104. The applications can communicate with counterpart applications or services, such as web services accessible via a network 132. In an example, the applications represent downloaded client-side applications that correspond to server-side services executing in a cloud.

In some examples, the memory 122 stores an alert manager 126. Alert manager 126 detects activation of one or more smart siren device(s) 104. When activated, a smart siren device emits a set of one or more sound(s) 110 associated with an audible alert type from the set of audible alert type(s) 108.

The alert manager generates 126 one or more digital alert notification(s) 128 when the smart siren device(s) 104 are activated. The digital alert notification 128 is a notification transmitted to a recipient computing device and providing notification data used by the recipient computing device to generate and/or display a digital alert to a user. The notification(s) 128 includes the current location of emergency vehicle 102.

In some examples, the notification(s) 128 are transmitted to a primary recipient computing system, such as, the cloud server 138. The primary recipient computing system then provides the notification(s) to one or more secondary recipient(s) 148. In other examples, the alert manager 126 transmits the notification directly to the selected recipient(s) 148. The digital alert is displayed to the selected recipient(s) 148 via a user device or vehicle computer system, such as, but not limited to, the on-board computing device 134 and/or a user device.

In an example scenario, the alert manager 126 transmits the digital alert notification(s) 128 to the cloud server 138. The cloud server 138 transmits the digital alert notification(s) 128, including notification data, to the on-board computing device 134 associated with the user. The user is a recipient in the set of recipient(s) 148. The on-board computing device 134 is within a predetermined range 146 of the emergency vehicle 102 when the smart siren device on the emergency vehicle 102 is activated. In response, the on-board computing device utilizes the notification data to generate a digital alert displayed to the user via a digital display on an output device, such as a user interface (UI) 140.

The network 132 is implemented by one or more physical network components, such as, but without limitation, routers, switches, network interface cards (NICs), and other network devices. The network 132 is any type of network for enabling communications with remote computing devices, such as, but not limited to, a cellular network, a local area network (LAN), a subnet, a wide area network (WAN), a wireless (Wi-Fi) network, or any other type of network. In this example, the network 132 is a WAN, such as the Internet.

The siren controller device 118, in some examples, includes a network device 130. The network device 130 enables the siren controller device 118 to communicate with one or more other remote devices via the network 132, such as, but not limited to, an on-board computing device 134 of a vehicle 136 and/or a cloud server 138.

The vehicle 136 is a vehicle associated with a recipient of the digital alert 142. The vehicle 136 in some examples is a non-emergency vehicle associated with a user which is not an emergency services personnel. In such cases, the digital alert enables the user to take appropriate action, such as pulling over to the side of the road as the emergency vehicle 102 passes by or reroute their travel to avoid the emergency vehicle.

In this example, digital alerts are provided to non-emergency vehicles. However, the examples are not limited to providing digital alert to non-emergency vehicles. In other examples, digital alerts are provided to other emergency vehicles as well as non-emergency vehicles.

In these examples, the digital alert enables the emergency services personnel associated with multiple emergency vehicles to coordinate their activities in a manner that maximizes resource usage while minimizing costs. For example, if an ambulance is responding to a medical emergency associated with a car accident, another emergency vehicle receiving the digital alert notification, such as a police vehicle or fire department vehicle, may reroute to the current location of the ambulance indicated in the digital alert 142 presented to the recipient to assist the ambulance.

In some examples, the recipient computing devices receiving the digital alert notification presents the digital alert to the user via an application, such as, but not limited to, a navigation application. The navigation application is any type of application for assisting a driver, such as, but not limited to, a global positioning system (GPS) application. For example, a navigational application can include Google® maps, Apple® maps, TomTom®, Ways®, or any other type of navigation application providing maps and/or driving directions. However, the examples are not limited to displaying digital alerts in navigation applications. The digital alerts can be provided to users via any application, such as, but not limited to, messaging applications, social media applications, etc.

The cloud server 138 is a logical server providing services to the siren controller device 118, the computing device 134, and/or a user device, such as, but not limited to, the user device 220 in FIG. 2 below. The cloud server 138 is hosted and/or delivered via the network 132. In some non-limiting examples, the cloud server 138 is associated with one or more physical servers in one or more data centers. In other examples, the cloud server 138 is associated with a distributed network of servers.

The on-board computing device 134 represents any device executing computer-executable instructions (e.g., as application programs, operating system functionality, or both) to implement the operations and functionality associated with the computing device 134. The computing device 134 connects the network 132 via a router or other network device located on the vehicle 136. In some examples, the vehicle 136 includes a user interface (UI) 140 for displaying digital alerts to a user, such as, but not limited to, the digital alert 142.

The digital alert 142 is an alert presented to the user to notify the user as to a location of the emergency vehicle 102 when one or more of the smart siren device(s) 104 are turned on (activated). The digital alert 142 is not displayed to the user when all the smart siren device(s) 104 are turned off (de-activated).

In some examples, the digital alert 142 includes an emergency vehicle indicator displayed on a digital map identifying the current location of the emergency vehicle on the digital map. In other examples, the digital alert 142 provides a pop-up alert on a digital display presented via the UI 140. The pop-up alert includes an identification of the current location of the emergency vehicle 102.

In some examples, the system triggers automatic digital notifications to certain recipients via applications, such as navigational applications, vehicle status applications presenting vehicle status information via a vehicle dashboard display screen, and/or other emergency vehicle systems. The digital alerts are provided when an emergency siren device is activated. The system provides customizable features/options regarding when the notifications are sent, which recipients receive them, and what information is included in the digital alerts presented to drivers and other recipients of the digital alerts. The options are user-configurable rules stores in a set of rules applied by the alert manager to determine when to generate alert notifications, what data to include in the notification and other parameters for the digital alert, such as, the set of rules 246 in FIG. 2 below. The notifications enable digital alerts to be provided to users alerting them that an emergency is occurring at this location, or an emergency vehicle is in the area responding to an emergency.

The digital alert is updated at regular time intervals, in some examples. The time interval is a user-configurable period of time set specified in a set of user-defined rules, such as the set of rules 246 in FIG. 2 below. The digital alert notification is transmitted by the alert manager at regular time intervals providing updated information regarding the changing location of an emergency vehicle in transit to the location of an emergency, enabling the application or vehicle computing system to update the digital alert presented to the user. Each updated digital alert notification provides a new current location of the emergency vehicle and/or any updated information regarding the state of the emergency, such as updated recommended actions for the recipient to take with regard to the emergency. The digital alert displayed on the UI is updated at the regular interval providing real-time information describing the changing location of emergency vehicles in the area. In one example, the digital alert updates every second, every three seconds, every five seconds, or any other time interval.

In other examples, the digital alerts have priority levels or alert levels output with the digital alert. For example, digital alerts customizable options enable the user to configure the system to provide a priority indicator with the digital alert. The priority indicator includes any type of ranking or classification, such as, but not limited to, a high priority digital alert and a low priority digital alert.

In some examples, the high priority (highest level) digital alert is provided in situations having a higher risk or danger associated with the event. In other examples, a high priority is provided for some audible alert type(s) while low priority is provided for other audible alert type(s). In one example, a wail, hi-lo or piercer siren type is given a high priority digital alert while a yelp or air horn siren type is given a low priority digital alert.

In another example, if the smart siren device is activated without activation of an emergency warning lightbar on the vehicle, a low priority digital alert is provided. If the siren is activated simultaneously with the emergency warning lightbar, the digital alert is a high priority digital alert. In these examples, the smart siren device alert manager receives data indicating whether a siren device is activated in conjunction with the lightbar. If the siren is not activated but the emergency lightbar is turned on, the digital alert is lower priority or not provided at all.

The high priority digital alert, in some examples, has a different look and/or is accompanied by a high priority graphical indicator or high priority text warning indicating the emergency is a higher level. The high priority digital alert, in other examples, is accompanied by colors like red, orange, yellow. The high priority digital alert in other examples includes larger text font and/or larger emergency vehicle icons than the low priority digital alert. Likewise, the high priority digital alert may refresh or update emergency information and/or current location of the emergency vehicle more frequently (shorter time interval) than the low priority digital alert. The high level/high priority alert indicates greater risk, greater severity of danger, a higher number of emergency vehicles, etc. For example, a category five hurricane is paired with a high priority digital alert, while a single ambulance responding to a residence is coupled with a low-level digital alert, indicating lower impact on motorists.

In this example, the network device is integrated within the smart siren device. However, in other examples, the network device is incorporated within a conversion device which is attachable to a pre-existing siren device. In this manner, a legacy siren device which is not equipped originally with an alert manager component and network device can be converted or upgraded via the conversion device to function like a smart siren device. In this example, the conversion device acts as the siren controller device monitoring activation status of the siren device. When the siren is activated, the conversion device generates the digital alert notification and transmits the digital alert notification to one or more recipients via the network. Thus, enabling pre-existing siren devices to be converted into smart siren devices capable of triggering digital alerts to drivers, thereby improving human-computer interaction via the user interface.

In the example of FIG. 1, the smart siren device(s) are associated with an emergency vehicle. However, in other examples, a smart siren device is mounted to a stationary object or other non-mobile fixture which is used for indicating an emergency or event when turned on. In an example, a smart siren device includes a stand-alone siren device mounted to a building, pole or other fixture, such as a tornado warning siren. In such cases, the stationary smart siren device includes the siren controller device for generating digital alert notifications when the siren device is activated. The digital alert is transmitted to a primary recipient, such as a cloud server. The primary recipient then transmits the digital alert to computing devices associated with homes, vehicles and people located within a vicinity of the stationary siren device and/or located within range of a storm, fire or other location in which an emergency or hazardous situation is occurring. In still other examples, the siren controller device of the stationary siren device transmits the digital alert directly to recipient computing devices associated with homes, vehicles and/or users within range of the smart siren device.

Figure 2:
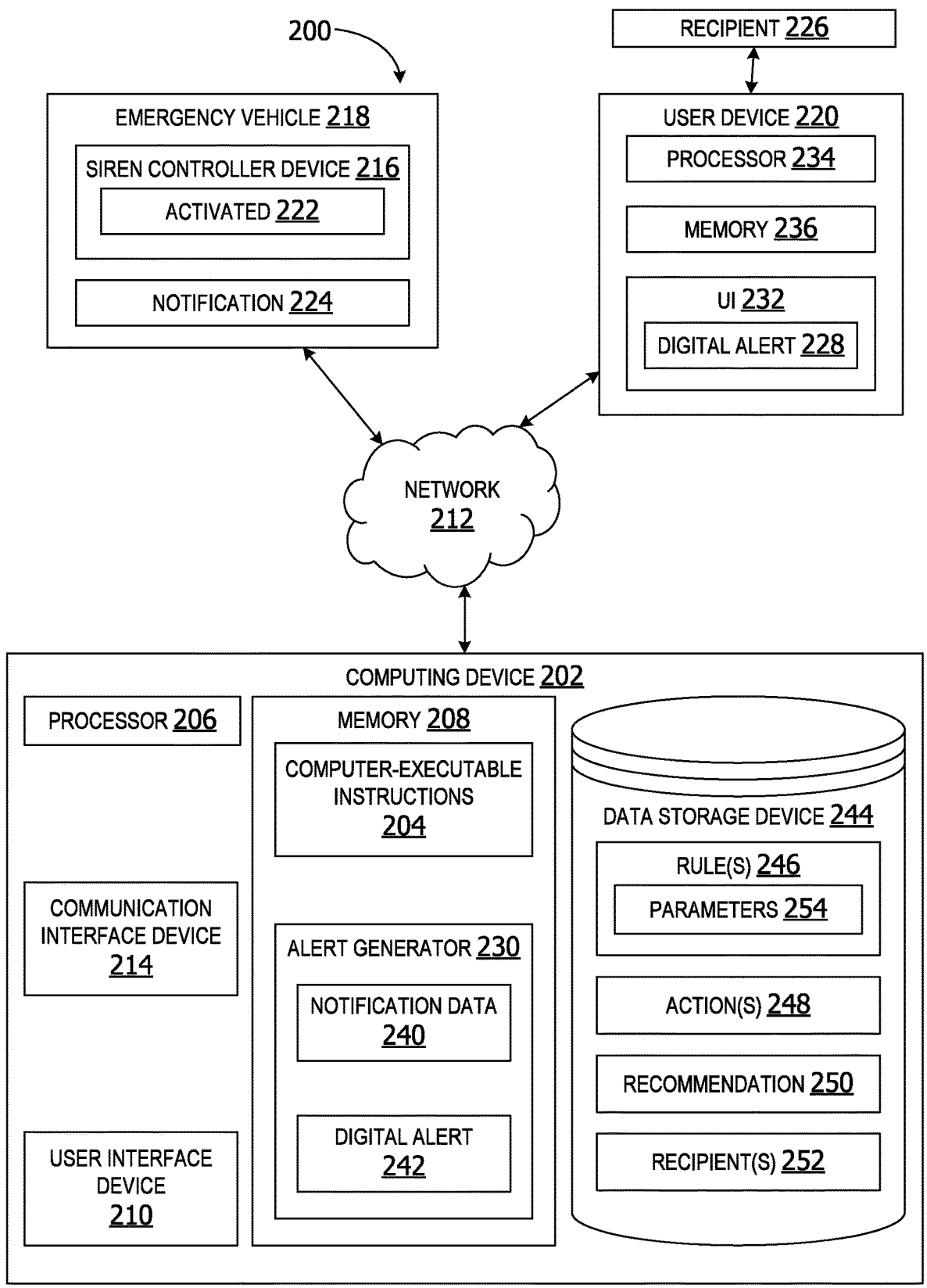
FIG. 2 is an exemplary block diagram illustrating a system for generating notifications identifying a location of emergency vehicles in a smart siren device activation state.

FIG. 2 is an exemplary block diagram illustrating a system 200 for generating notifications identifying a location of emergency vehicles in an emergency siren activation state. In the example of FIG. 2, the computing device 202 represents any device executing computer-executable instructions 204 (e.g., as application programs, operating system functionality, or both) to implement the operations and functionality associated with the computing device 202. The computing device 202, in some examples, includes a mobile computing device or any other portable device. A mobile computing device includes, for example but without limitation, a mobile telephone, laptop, tablet, computing pad, netbook, gaming device, and/or portable media player. The computing device 202 can also include less-portable devices such as servers, desktop personal computers, kiosks, or tabletop devices. Additionally, the computing device 202 can represent a group of processing units or other computing devices.

In some examples, the computing device 202 has at least one processor 206 and a memory 208. The computing device 202, in other examples includes a user interface component 210.

The processor 206 includes any quantity of processing units and is programmed to execute the computer-executable instructions 204. The computer-executable instructions 204 is performed by the processor 206, performed by multiple processors within the computing device 202 or performed by a processor external to the computing device 202. In some examples, the processor 206 is programmed to execute instructions such as those illustrated in the figures (e.g., FIG. 13 and FIG. 14).

The computing device 202 further has one or more computer-readable media such as the memory 208. The memory 208 includes any quantity of media associated with or accessible by the computing device 202. The memory 208, in these examples, is internal to the computing device 202 (as shown in FIG. 2). In other examples, the memory 208 is external to the computing device (not shown) or both (not shown).

The memory 208 stores data, such as one or more applications. The applications, when executed by the processor 206, operate to perform functionality on the computing device 202. The applications can communicate with counterpart applications or services such as web services accessible via a network 212. In an example, the applications represent downloaded client-side applications that correspond to server-side services executing in a cloud.

In other examples, the user interface component 210 includes a graphics card for displaying data to the user and receiving data from the user. The user interface component 210 can also include computer-executable instructions (e.g., a driver) for operating the graphics card. Further, the user interface component 210 can include a display (e.g., a touch screen display or natural user interface) and/or computer-executable instructions (e.g., a driver) for operating the display. The user interface component 210 can also include one or more of the following to provide data to the user or receive data from the user: speakers, a sound card, a camera, a microphone, a vibration motor, one or more accelerometers, a BLUETOOTH® brand communication module, wireless broadband communication (LTE) module, global positioning system (GPS) hardware, and a photoreceptive light sensor. In a non-limiting example, the user inputs commands or manipulates data by moving the computing device 202 in one or more ways.

The network 212 is a network, such as, but not limited to, the network 132 in FIG. 1. The network 212 is implemented by one or more physical network components, such as, but without limitation, routers, switches, network interface cards (NICs), and other network devices. The network 212 is any type of network for enabling communications with remote computing devices, such as, but not limited to, a local area network (LAN), a subnet, a wide area network (WAN), a wireless (Wi-Fi) network, or any other type of network. In this example, the network 212 is a WAN, such as the Internet. However, in other examples, the network 212 is a local or private LAN.

In some examples, the system 200 optionally includes a communications interface device 214. The communications interface device 214 includes a network interface card and/or computer-executable instructions (e.g., a driver) for operating the network interface card. Communication between the computing device 202 and other devices, such as but not limited to a siren controller device 216 on an emergency vehicle 218 and/or a user device 220, can occur using any protocol or mechanism over any wired or wireless connection. In some examples, the communications interface component 214 is operable with short range communication technologies such as by using near-field communication (NFC) tags.

The siren controller device 216 is a device including a processor, a memory, and a network device, such as, but not limited to, the siren controller device 118 in FIG. 1. The siren controller device 216 detects a change in activation state of a smart siren device to an activated state. The smart siren device emits sounds associated with a selected audible siren type when activated 222 (activated state).

In some examples, the alert manager executing on the siren controller device 216 determines whether the emergency vehicle is in motion. The siren controller device 216 generates a digital alert notification 224 identifying a current location of the emergency vehicle if the emergency vehicle is in motion and the smart siren device is in the activated state. In other examples, the notification 224 is generated if one or more smart siren devices are activated on the emergency vehicle 218, regardless of whether the emergency vehicle is in motion or stationery. A vehicle is stationary if the vehicle is parked or otherwise not moving/driving. In other examples, the notification is only generated if the emergency vehicle is in motion while the smart siren device is activated 222.

The siren controller device 216 provides the digital alert notification to a selected recipient 226 via network 212. In some examples, the recipient 226 is a user that has registered or subscribed to a digital alert service to receive digital alerts. In other examples, the recipient 226 is a user viewing a navigation application or other application which receives the notification 224 from an alert generator 230 on the computing device. In still other examples, the notification 224 is transmitted to the alert generator 230 on the computing device 202. The alert generator 230 obtains location data and other emergency-related information from the notification 224. The alert generator 230 uses the location data and other emergency-related information to generate the digital alert 228. The alert generator 230 then transmits the digital alert 228 to the user device 220 for display to the user via a UI 232.

The digital alert 228, in some examples, includes an indicator identifying the current location of an emergency vehicle and/or other emergency-related information displayed on a graphical user interface, such as, but not limited to, the UI 232 of the user device 220 and/or a user interface associated with another vehicle, such as the UI 140 in the vehicle 136. In other examples, the digital alert 228 is only presented to recipient computing devices, accounts, and/or applications that have opted-in to receive the digital alerts and are currently located within a predetermined range of the emergency vehicle 218 which has their siren(s) activated 222.

In some examples, the digital alert 228 is a graphical alert indicating the current location of the emergency vehicle 218. The digital alert optionally includes additional emergency-related information, such as, an identification of the type of the emergency vehicle, an identification of the type of emergency, direction of travel of the emergency vehicle, estimated time for the emergency vehicle to reach the recipient's current location, a recommended action for the user to take, etc. The type of vehicle includes a firetruck, police vehicle, highway patrol, ambulance, tow truck, utility vehicle, construction vehicle, search, and rescue vehicle, etc. The type of the emergency can include a medical emergency, weather-related emergency, a vehicle collision/car accident, disabled vehicle, hazardous material spill, etc.

The user device 220 represent any device executing computer-executable instructions. The user device 220 can be implemented as a mobile computing device, such as, but not limited to, a wearable computing device, a mobile telephone, laptop, tablet, computing pad, netbook, gaming device, and/or any other portable device. The user device 220 includes at least one processor 234 and a memory 236. The user device 220 can also include the UI 232. In this example, the user device 220 is associated with a recipient 226 of the digital alert 228 located within range of the emergency vehicle 218.

In some examples, the alert generator 230 obtains notification data 240, including the current location of the emergency vehicle, from the notification 224 received from the siren controller device 216. The alert generator 230 utilized the notification data 240 to generate the digital alert 242. The digital alert 242 is a digital alert notifying a user (recipient) regarding the proximity of an emergency vehicle having emergency sirens activated indicating the emergency vehicle is likely in process of responding to an emergency or other potentially hazardous condition or situation. The digital alert is transmitted to one or more recipients via the network 212. The digital alert is presented to the recipient(s) via the UI 232 or other output device capable of displaying a digital alert. The digital alert is provided via the UI on any computing device, such as, but not limited to, a smart watch, smart phone, dashboard display screen in a vehicle, laptop, table computing device, etc.

In this example, the alert generator is a software application on a third-party server, such as the cloud server. The third-party server transmits the digital alert to the recipient computing device associated with a recipient in a vehicle within range of the emergency vehicle. However, in other examples, the digital alert generator is an application on the recipient computing device associated with a recipient in a vehicle within range of the emergency vehicle. In these examples, the alert manager transmits the notification directly to the recipient computing device associated with the vehicle that is within range of the emergency vehicle. In other words, the digital alert notification is sent directly to a recipient associated with a vehicle within range of the emergency vehicle. An alert generator application on a computing device of the recipient receives the notification and uses the notification data from the digital alert notification to generate the digital alert on the computing device for presentation to the recipient.

The system 200 can optionally include a data storage device 244 for storing data, such as, but not limited to rules(s) 246 for determining if and when to provide a digital alert to users, action(s) 248 or recommendation(s) 250 provided to recipients, as well as a list of recipient(s) 252 or potential recipient(s) of the digital alert.

The rules 246 include one or more parameters 254 applied to the notification data 240 to determine whether a digital alert notification should be generated and sent out to one or more recipients. The recipient can include a third-party service and/or individual users within range of the emergency vehicle.

In one example, the rules 246 state that a digital alert notification should only be sent if an emergency siren device is activated while the emergency vehicle is in motion. If the vehicle is parked, no digital alert notification should be sent. In another example, the rules can include a requirement that the digital alert notification should only be sent if the emergency vehicle siren device(s) are activated, and the emergency vehicle speed exceeds a threshold minimum speed. In still another example, the rules optionally include a parameter stating that a recipient only receive digital notifications if the recipient has opted-in to receive the digital alerts within a navigation application or other application. In another example, the rules specify no digital alert is provided to recipients that have opted-out of receiving the digital alerts.

Another example includes a rule that digital alerts notifications are only sent to recipients in response to specific audible siren types being activated on the smart siren device(s). In this example, the digital alert notification is sent out if a smart siren device is activated and a user has selected a specific audible siren type, such as a first siren type. If the user selects a different audible siren type (second siren type), the digital alert notification is not sent out to recipients. In other words, the digital alert is only sent out for certain siren types and the digital alert is not sent out for other siren types in these examples. However, in other examples, a digital alert is sent out for any siren type (all siren types). Thus, whenever the smart siren device is activated, a digital alert is sent out.

In another example, digital alert notifications are only sent to recipients if the siren device is activated while the emergency vehicle is located within certain areas. If the emergency vehicle is located outside the designated alert areas, no digital alert is provided. For example, the system may only send out digital alert notifications if the emergency vehicle is traveling on a paved, public road. In these examples, if the emergency vehicle is located on a private road, unpaved road, or other remote areas, no digital alert notification is sent out.

The action(s) 248 include one or more actions or behaviors which the system can suggest to a driver of a vehicle during a digital alert presentation. An action can include pulling over to the left side of the road, bringing the vehicle to a stop until the emergency vehicle passes by, following a detour, exiting a freeway via an off-ramp, pulling into a parking lot, turning on emergency blinkers, turning on headlights, etc. The action(s) 248 are displayed, in some examples, with the current location of the emergency vehicle via the UI as while the digital alert is being presented to the user/recipient.

The recommendation 250 is a recommendation provided to the user with the digital alert. For example, if the digital alert includes the location of several firetrucks responding to a wildfire in the vicinity, the digital alert 228 optionally includes a recommendation 250 for the driver of a non-emergency vehicle to re-route away from the wildfires and/or in a direction away from the direction the fire is moving. The recommendation may also include instructions such as roll-up windows, stay on paved roadways, evacuate the area, etc.

The data storage device 244 can include one or more different types of data storage devices, such as, for example, one or more rotating disks drives, one or more solid state drives (SSDs), and/or any other type of data storage device. The data storage device 244, in some non-limiting examples, includes a redundant array of independent disks (RAID) array. In some non-limiting examples, the data storage device(s) provide a shared data store accessible by two or more hosts in a cluster. For example, the data storage device may include a hard disk, a redundant array of independent disks (RAID), a flash memory drive, a storage area network (SAN), or other data storage device. In other examples, the data storage device 244 includes a database.

The data storage device 244, in this example, is included within computing device 202, attached to the computing device, plugged into the computing device, or otherwise associated with the computing device 202. In other examples, the data storage device 244 includes a remote data storage accessed by the computing device via the network 212, such as a remote data storage device, a data storage in a remote data center, or a cloud storage.

Figure 3:
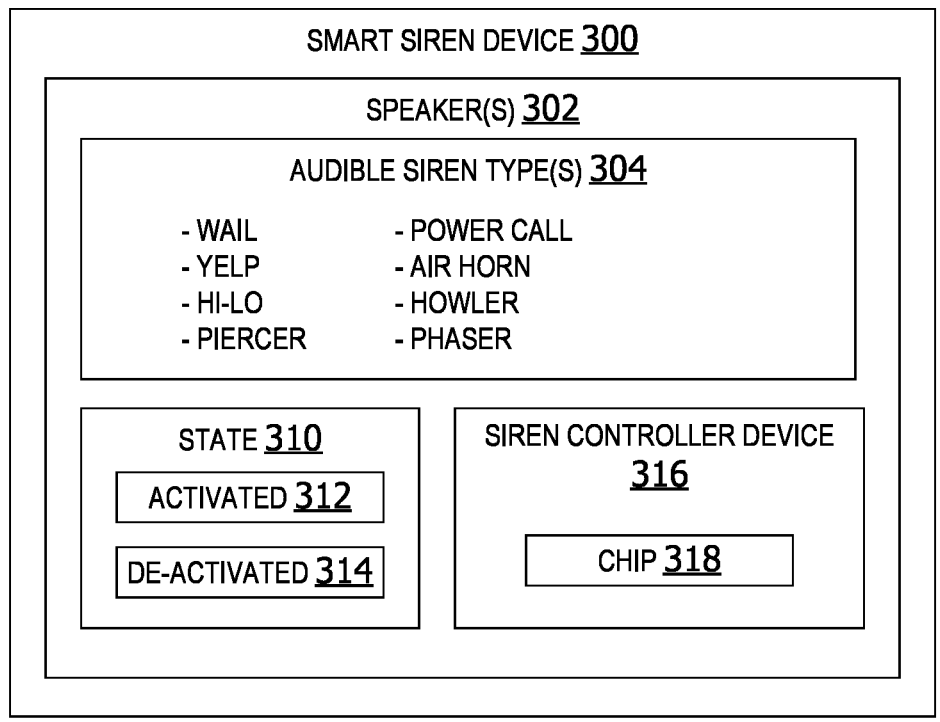
FIG. 3 is an exemplary block diagram illustrating an emergency vehicle smart siren device having a siren controller device generating device activation notification(s).

FIG. 3 is an exemplary block diagram illustrating a smart siren device 300 having a siren device controller generating siren activation notification(s). The smart siren device 300 is a device for generating siren sounds, such as, but not limited to, the siren device(s) 104 in FIG. 1.

The smart siren device 300, in some examples, includes a set of one or more speaker(s) 302 for generating sound(s) associated with one or more audible siren type(s) 304. The audible siren type(s) 304 includes, without limitation, wail, yelp, hi-lo, piercer, power call air horn, howler, and/or phaser. However, the examples are not limited to these siren types. In other examples, the audible siren type(s) can include bell sounds, beeping sounds, whistle sounds, or any other type of sounds.

The siren has a state 310 indicating whether the speaker(s) are turned on or turned off. When turned on, the siren device state is activated 312. When turned off, the siren is a de-activated 314 state.

The siren controller device 316 is a device for monitoring the activation state of one or more smart siren devices and generating digital alert notifications, such as, but not limited to, the siren controller device 118 in FIG. 1 and/or the siren controller device 216 in FIG. 2. In this example, the siren controller device 316 includes a cellular chip 318 enabling the siren controller device to transmit digital alert notifications via a network, such as, but not limited to, the network 132 in FIG. 1 and/or the network 212 in FIG. 2.

Figure 4:
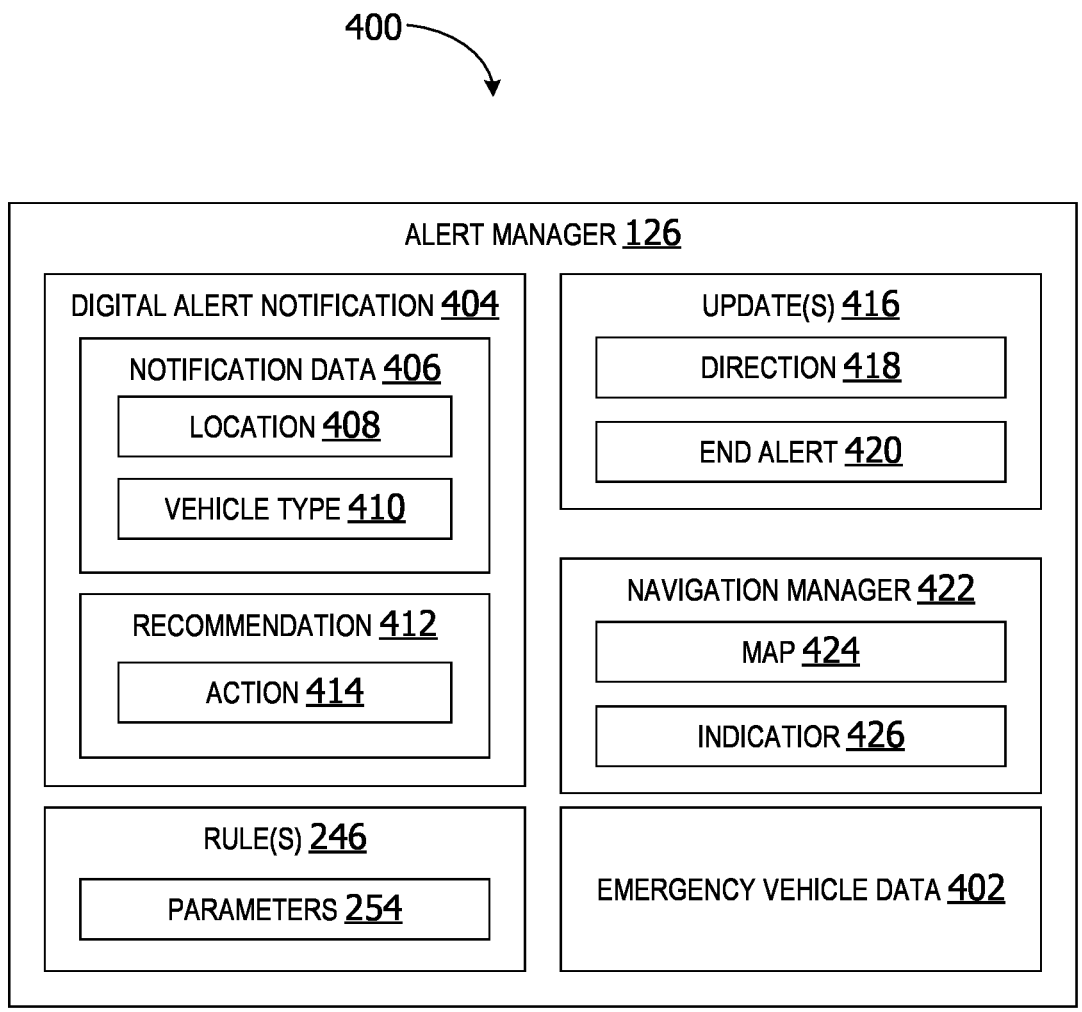
FIG. 4 is an exemplary block diagram illustrating an alert manager for generating digital alerts based on smart siren device activation notification(s).

Turning now to FIG. 4, an exemplary block diagram illustrating an alert manager 126 for generating digital alerts based on siren device activation notification(s) is shown. The alert manager 126, in some examples, includes a set of rules(s) 246 having one or more parameters 254 which are applied to emergency vehicle data 402 associated with the activation of one or more smart siren device(s) on a given emergency vehicle. The rule(s) 246 include parameters related to factors, such as, but not limited to, a speed of the emergency vehicle, direction of travel, type of flash pattern of the emergency warning light(s), audible siren type, siren volume, date, time, area/location of the emergency vehicle, whether digital alerts have been manually disabled, etc.

In one example, the rules include a parameter specifying that digital alert notifications are not sent if the digital alert service has been manually disabled. The service is manually disable in some examples where a user engages a switch or lever within the passenger compartment to manually disable transmission of digital alert notifications to recipients. In other examples, the user prevents transmission of digital alert notifications by selecting a programmable option on an on-board computing device, user device or other computing device communicatively coupled to the siren controller device.

In another example, the rules 246 specify notifications are sent to vehicles driving in a direction of travel that is the same direction as the emergency vehicle, but the notifications are not sent to vehicles driving in the opposite direction or otherwise moving away from the emergency vehicle.

In yet another example, the rules optionally specify a user-configurable range within which notifications are sent. In other words, notifications are only sent to vehicles or computing devices associated with users/vehicles within the user-configurable range of the emergency vehicle. In one example, if the range is one mile, the digital alerts are provided to recipients within the one-mile range, but the digital alerts are not provided to recipients more than one mile away.

The emergency vehicle data 402 is data related to the emergency vehicle which is sending out the digital alert notification 404. The emergency vehicle data 402 identifies information, such as, but not limited to, the type of vehicle, location of the vehicle, speed, direction of travel, time, etc. The alert manager 126 applies the rules(s) to the emergency vehicle data to determine whether to generate the digital alert notification 404.

The digital alert notification 404 is a notification generated by the alert manager when a smart siren device is activated on the emergency vehicle, such as, but not limited to, the notification(s) 128 in FIG. 1 and/or the notification 224 in FIG. 2. The digital alert notification 404 includes notification data 406 associated with the current siren device activation. The notification data 406 includes, for example, the current location 408 of the vehicle. The notification data 406 optionally includes vehicle type 410. The vehicle type 410 identifies the type of emergency vehicle, such as, but not limited to, police vehicle, fire department vehicle, ambulance, tow truck, etc.

The digital alert notification 404 in some examples includes a recommendation 412 which is optionally presented to the user with the digital alert. The recommendation 412 includes a recommended action 414, such as, but not limited to, a recommendation that the driver pull over to the left side of the road until the emergency vehicle passes by, an instruction to reroute around an accident scene, a recommendation to evacuate an area, a recommendation to seek shelter during a storm or other weather emergency event, etc.

In some examples, the alert manager 126 generates real-time update(s) 416 which are transmitted to the recipients after the initial digital alert notification is sent. The update(s) 416 can include updates on the direction 418 of travel of the emergency vehicle and/or an indication to end an alert "end alert 420" when the smart siren device is de-activated. The update(s) can also include updated recommendations/actions in addition to the updated vehicle location information.

In other examples, the alert manager 126 includes a navigation manager 422. The navigation manager 422 includes instructions for generating a map 424 including a location of the emergency vehicle and/or an indicator rendered on the map identifying the location of the emergency vehicle on the map. The indicator 426 in some examples is moved along the map to illustrate movements of the emergency vehicle in real-time, further enabling emergency vehicle recipients and non-emergency vehicle recipients to take appropriate action.

Figure 5:
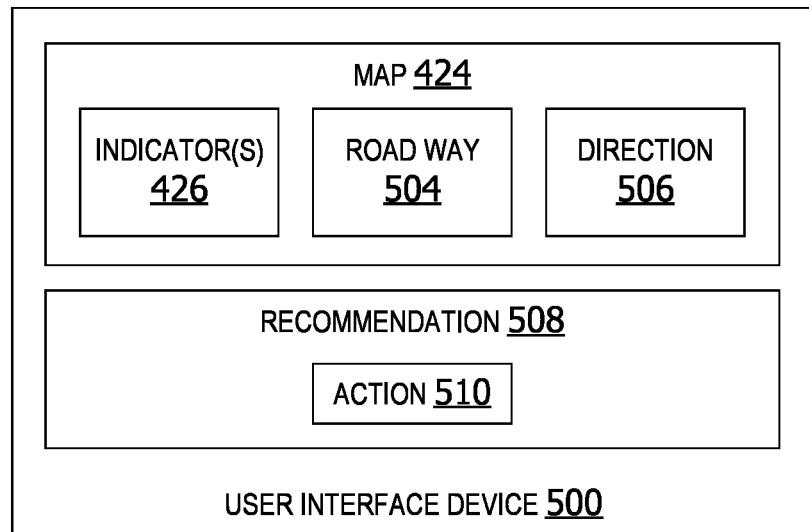
FIG. 5 is an exemplary block diagram illustrating a navigation application providing a digital alert associated with a map displayed on a user interface device.

FIG. 5 is an exemplary block diagram illustrating a navigation application map 424 displayed on a user interface device 500. The user interface device 500 is a device for presenting a digital alert to a user, such as, but not limited to, the UI 140 in FIG. 1 and/or the UI 232 in FIG. 2. In this example, the map 424 includes an emergency vehicle indicator 426 graphic icon representing the current location of the emergency vehicle on the map 424. The map 424 optionally includes illustrations representing the roadway 504 or streets on which the emergency vehicle is traveling and/or the direction 506 of travel. A recommendation 508 including a recommended action 510 is optionally also provided within the display output to the user via the user interface device 500.

Figure 6:
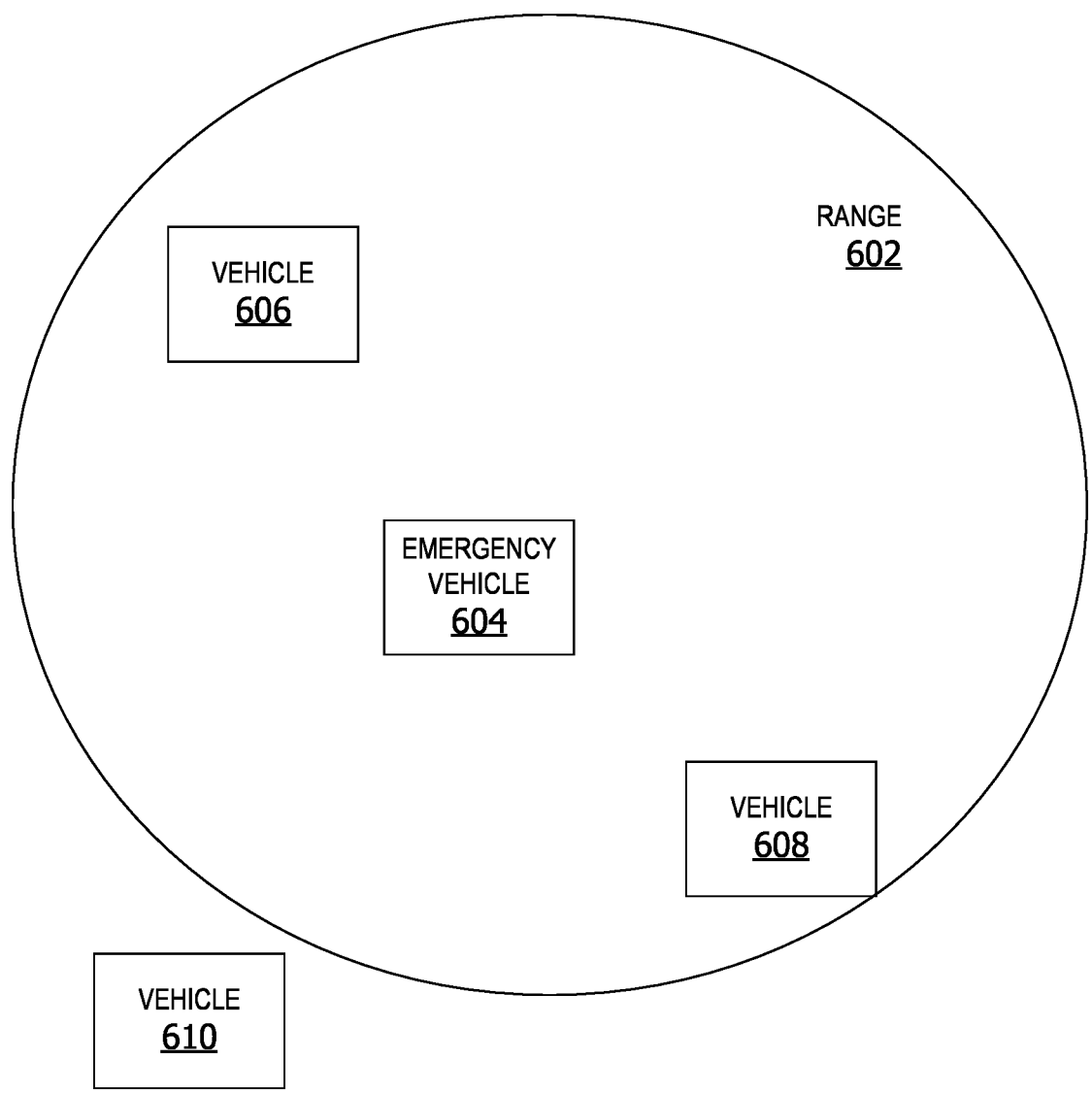
FIG. 6 is an exemplary block diagram illustrating vehicles within a predetermined range of an emergency vehicle receiving digital alerts associated with activation of a smart siren on the emergency vehicle.

Referring now to FIG. 6, an exemplary block diagram illustrating vehicles within a predetermined range 602 of an emergency vehicle 604 receiving digital alerts associated with activation of emergency sirens on the emergency vehicle. In this example, the vehicle 606 and the vehicle 608 are located within the predetermined range 602 of the emergency vehicle. The digital alert data is sent to a computing device associated with the vehicle 606 and the vehicle 608 in this example. The digital alert data is used to generate the digital alert on the UI. However, the digital alert data is not sent to the vehicle 610 which is outside the predetermined range 602 of the emergency vehicle 604.

Figure 7:
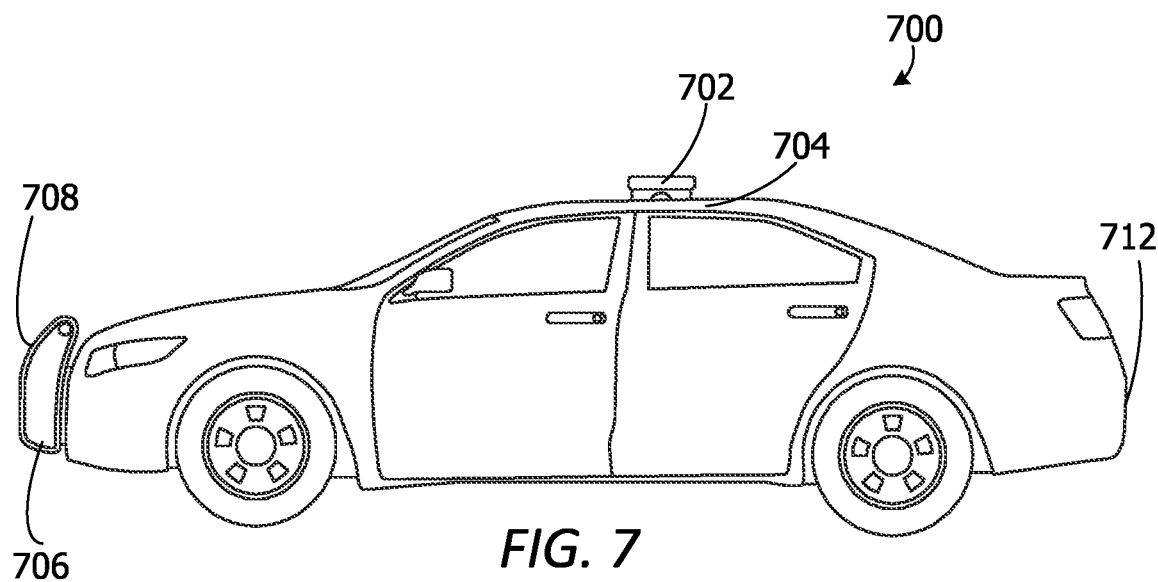
FIG. 7 is an exemplary block diagram illustrating an emergency vehicle sedan having an alert manager generating smart siren device activation notifications.

FIG. 7-FIG. 12 are examples of emergency vehicles having a siren controller device for transmitting digital alert notifications to recipients. Referring to FIG. 7, an exemplary block diagram illustrating an emergency vehicle sedan 700 having an alert manager generating smart siren device activation notifications is shown. In this example, the smart siren device includes a speaker 702 installed on an exterior surface of the vehicle. In this example, the speaker is located on roof 704 of the vehicle near the emergency warning lightbar. However, in other examples, the siren device is mounted on any exterior surface of the vehicle. For example, the vehicle sedan 700 can also include a smart siren device 706 mounted on or under a front grill 708 of the vehicle. In other examples, a speaker can optionally be mounted to a front grill 708, the back 712 of the vehicle, or any other part of the vehicle.

Figure 8:
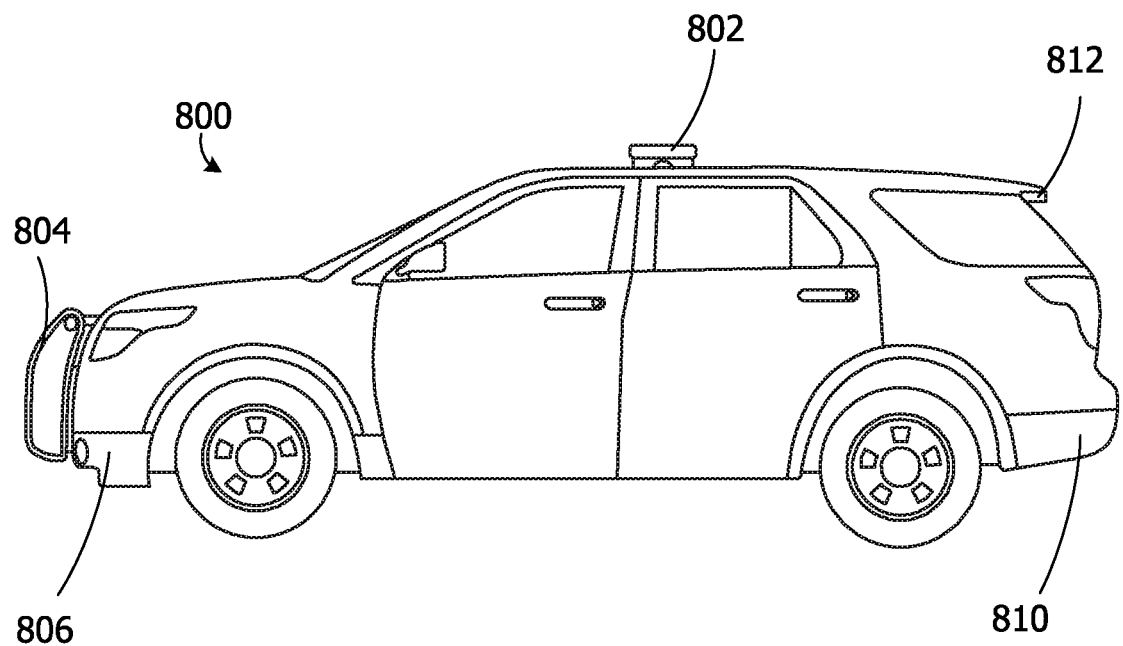
FIG. 8 is an exemplary block diagram illustrating an emergency vehicle sports utility vehicle (SUV) having an alert manager generating smart siren device activation notifications.

FIG. 8 is an exemplary block diagram illustrating an emergency vehicle sports utility vehicle (SUV) vehicle 800 having an alert manager generating smart siren device activation notifications. In this example, the SUV vehicle 800 includes a smart siren device speaker 802 mounted to the roof of the SUV vehicle 800. The vehicle, in this example, also optionally includes a speaker or other sound generating device mounted on a grill 804, a front bumper 806, a rear bumper 810 and/or a back portion 812 of the SUV vehicle 800.

Figure 9:
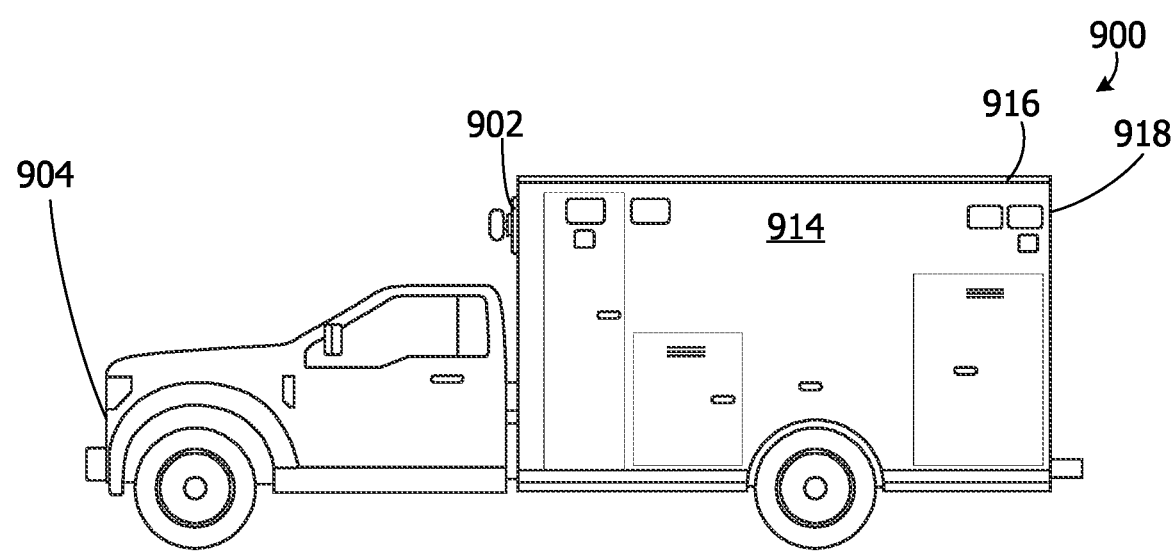
FIG. 9 is an exemplary block diagram illustrating an emergency vehicle truck having an alert manager generating smart siren device activation notifications.

FIG. 9 is an exemplary block diagram illustrating an emergency vehicle truck 900 having an alert manager generating smart siren device activation notifications. In this example, truck 900 includes a smart siren device speaker 902 mounted to an exterior portion of the truck. In other examples, one or more speakers may be mounted to roof 916, the front bumper 904, side 914, roof 916, back 918 and/or any other portion of the vehicle truck 900.

Figure 10:
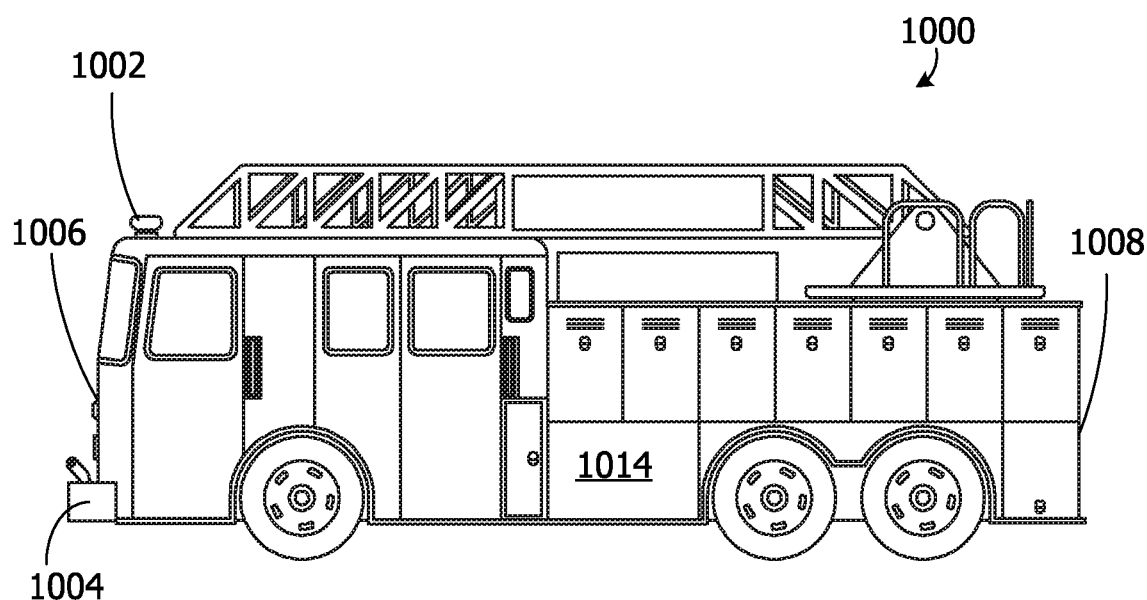
FIG. 10 is an exemplary block diagram illustrating an emergency vehicle firetruck having an alert manager generating smart siren device activation notifications.

Turning now to FIG. 10, an exemplary block diagram illustrating an emergency vehicle firetruck 1000 having an alert manager generating smart siren device activation notifications is depicted. In this example, a smart siren device 1002, including at least one speaker or other sound generating device, is mounted to the roof of a firetruck cab. The smart siren device and/or a speaker associated with the smart siren device may also be mounted to other locations on the vehicle, such as, but not limited to, the front bumper 1004, front grill 1006, the side 1014, back 1008, or any other part of the firetruck 1000.

Figure 11:
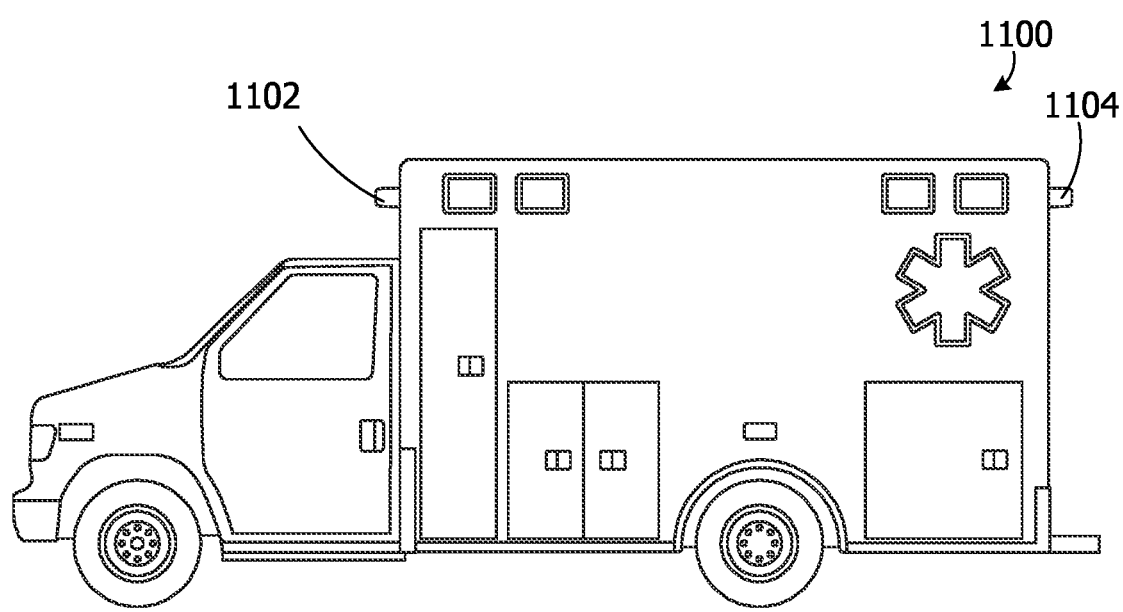
FIG. 11 is an exemplary block diagram illustrating an emergency vehicle ambulance having an alert manager generating smart siren device activation notifications.

FIG. 11 is an exemplary block diagram illustrating an emergency vehicle ambulance 1100 having an alert manager generating smart siren device activation notifications. In this example, a smart siren device 1102 is mounted to a front portion of the ambulance above the cab. In other examples, the siren device may be mounted to a back portion 1104 of the ambulance 1100.

Figure 12:
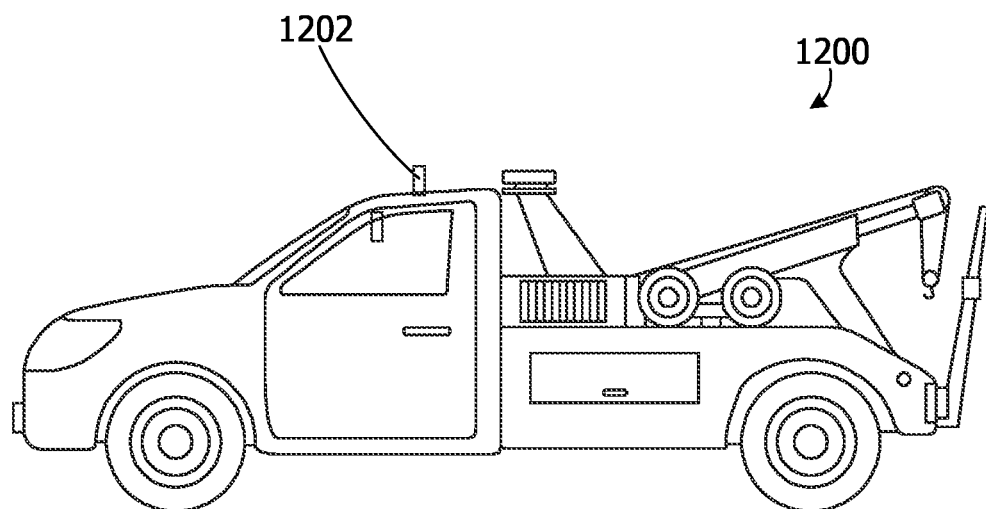
FIG. 12 is an exemplary block diagram illustrating an emergency vehicle tow truck having an alert manager generating smart siren device activation notifications.

FIG. 12 is an exemplary block diagram illustrating an emergency vehicle tow truck 1200 having an alert manager generating smart siren device activation notifications. The tow truck 1200, in this example, includes a smart siren device 1202 mounted to the exterior surface of the roof of the tow truck.

Figure 13:
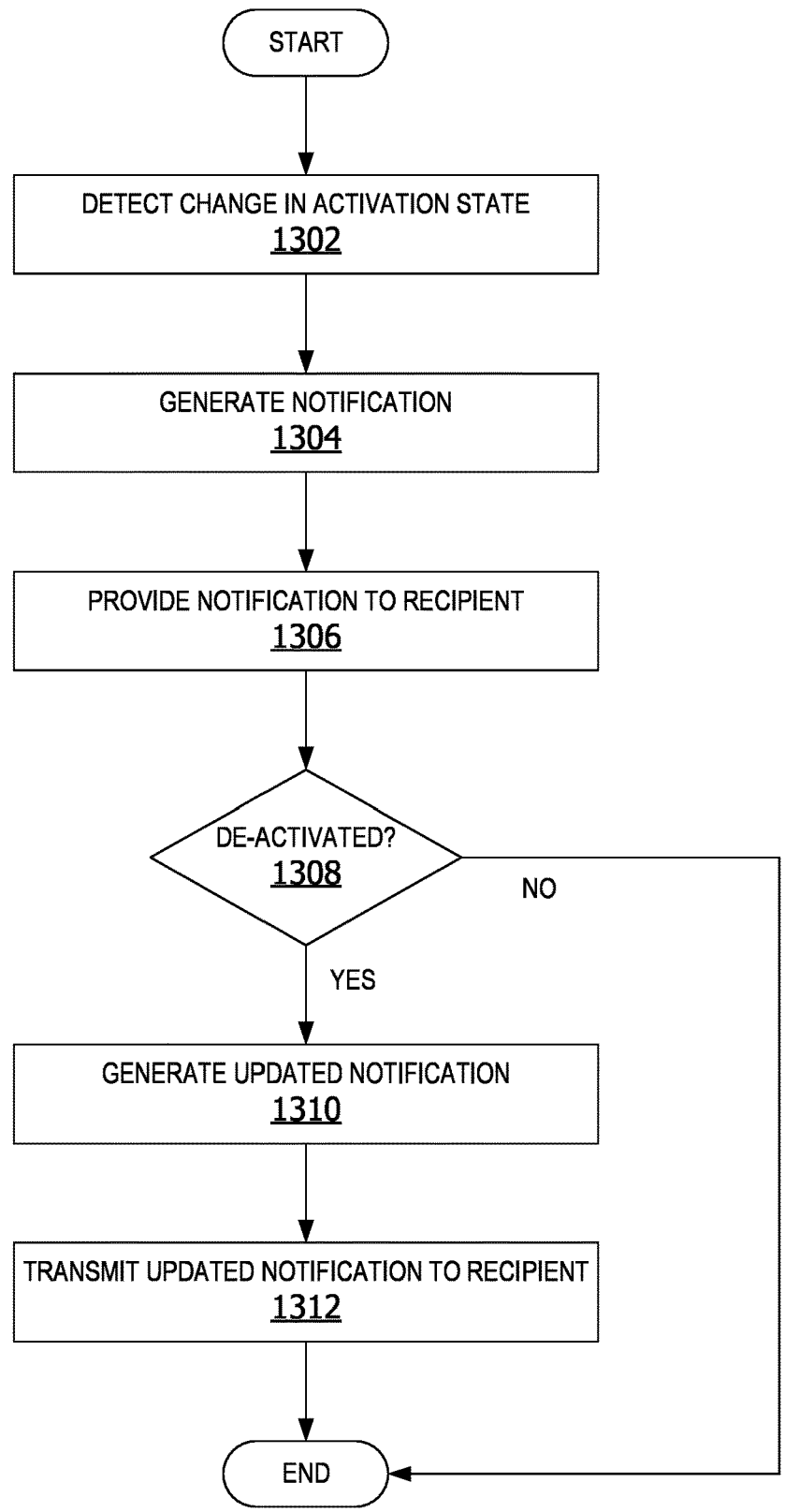
FIG. 13 is an exemplary flow chart illustrating the operation of the computing device to generate smart siren device activation notifications.

FIG. 13 is an exemplary flow chart illustrating operation of the computing device to generate smart siren device activation notifications. The process shown in FIG. 13 is performed by an alert manager executing on a computing device, such as the siren controller device 118 in FIG. 1, the siren controller device 216 in FIG. 2 or the siren controller device 316 in FIG. 3.

The process begins by detecting a change in activation state of a smart siren device at 1302. The alert manager generates a digital alert notification at 1304. The alert manager provides the digital alert notification to a recipient at 1306. The recipient can include an application on a computing device, or a digital alert service hosted on a cloud server, such as the cloud server 138 in FIG. 1. The alert manager determines if the smart siren device is de-activated at 1308. If yes, the alert manager generates an updated notification at 1310. The updated notification includes an indication that the emergency sirens are no longer turned on. The alert manager transmits the updated notification to the recipient at 1312. The process terminates thereafter. Returning to 1308, if the smart siren device is not de-activated, the process terminates thereafter.

While the operations illustrated in FIG. 13 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 13.

Figure 14:
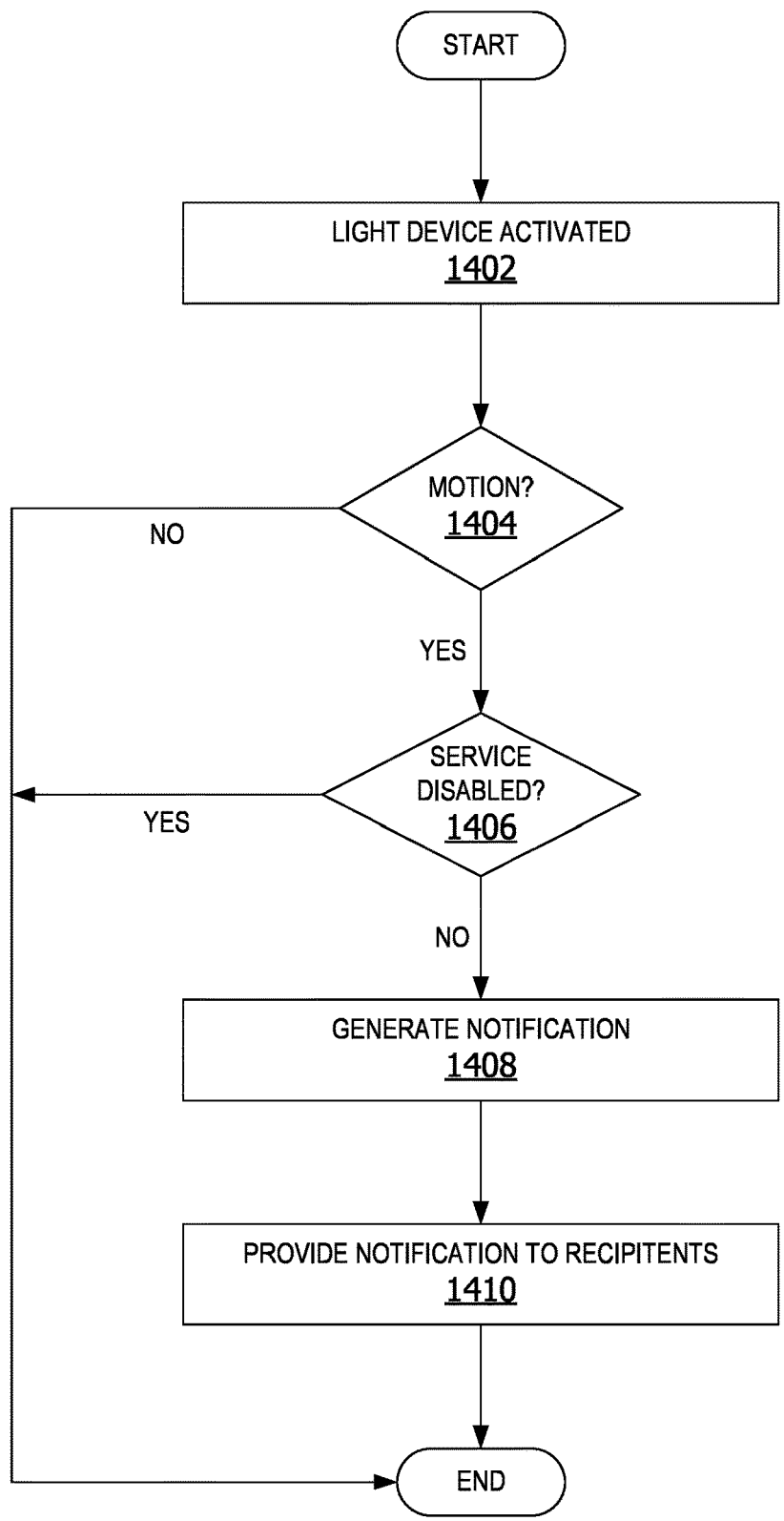
FIG. 14 is an exemplary flow chart illustrating the operation of the computing device to provide smart siren device activation notifications to recipients.

FIG. 14 is an exemplary flow chart illustrating the operation of the computing device to provide smart siren device activation notifications to recipients. The process shown in FIG. 14 is performed by an alert manager executing on a computing device, such as the siren controller device 118 in FIG. 1, the siren controller device 216 in FIG. 2 or the siren controller device 316 in FIG. 3.

The process begins when a siren device is activated at 1402. The alert manager determines if the emergency vehicle is in motion at 1404. If the vehicle is stationary, the process terminates. If the vehicle is in motion, the alert manager determines if the digital alert service is disabled at 1406. If yes, the process terminates thereafter. The service can be disabled via a manual control, such as pressing a physical switch, clicking a menu option on a graphic UI, or any other known or available means for disabling a function on a device. The alert manager generates a digital alert notification at 1408 if the service is not disabled. The notification is provided to the recipient(s) at 1410. The process terminates thereafter.

While the operations illustrated in FIG. 14 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 14.

Additional Examples

In some examples, the emergency vehicle siren device includes a network device, such as a cellular chip, wi-fi chip, radio transmitter, or other network device. The network device is incorporated inside the siren device or communicatively coupled to the siren device via a conversion device that transmits a digital alert notification to one or more recipients via a cellular network, the internet, NFC, wired connection to a network router device, or any other means of wired or wireless communications. In some non-limiting examples, the alert manager optionally transmits the digital alert notification is transmitted via a radio frequency, such as amplitude modulation (AM)/frequency modulation (FM) radio. In other examples, the smart siren device includes a wi-fi chip connected to a router within the vehicle.

In an example scenario, the alert manager transmits the digital alert notification to a primary recipient, such as an automobile manufacturer server, when the smart siren device is activated. The primary recipient server then transmits the digital alert data to a plurality of secondary recipients, such as computing devices associated with vehicles made or serviced by the automobile manufacturer. For example, if the notification is sent to a digital alert service provider associated with Ford®, the digital alert service provider then transmits the digital alert data to a plurality of secondary recipients such as vehicles manufactured and/or serviced by Ford®. The secondary recipient vehicle computing systems then generate the digital alert using the digital alert data to display the digital alert on a user interface display screen within the vehicle passenger compartment for viewing by the vehicle driver and/or passengers.

In other examples, the primary recipient server transmits the digital alert data to a plurality of recipient computing systems associated with self-driving navigational systems of self-driving vehicles. The digital alert data informs the self-driving navigational systems of the presence of an emergency vehicle within the predetermined range of the self-driving vehicle. The self-driving vehicle navigational systems then take appropriate action to maneuver the self-driving vehicle out of the path of the on-coming emergency vehicle and/or take any other appropriate action given the nature of the emergency type, type of emergency vehicle, current traffic conditions, road conditions, weather conditions, and any other relevant factors.

In an example scenario, turning on an emergency siren triggers the alert manager to send a digital alert notification to a cloud server via a cellular network. The cloud server is a primary recipient. The cloud server can be a system associated with a third-party, such as a city, vehicle manufacturer, vehicle services provider, mapping/navigation platform, social media platform, mobile device system, or any other type of third-party. In some examples, the cloud platform is accessed by the alert manager via an API or portal page. The cloud server system (cloud infrastructure) identifies secondary recipients currently located within the range of the emergency vehicle and subscribed to receive the digital alerts. The cloud server system transmits digital alert data to the identified secondary recipients (vehicle computing systems and user devices (applications) associated with subscribed users). The recipient computing system (application) receiving the digital alert data renders the digital alert via a user interface for viewing by the user. This enables the system to seamlessly redirect traffic, provide alternative routes, direct drivers to slow down or pull over, provide evacuation instructions, etc. This system can further be utilized by emergency response systems, such as dispatchers, to clear traffic from roads ahead of the arrival of the emergency vehicles. In this manner, an application can be used to redirect vehicles away from the path of oncoming emergency vehicles before the emergency vehicles arrive/enter the street or other roadway for greater efficiency and reduced risk to drivers and other vehicles on the road.

In other examples, the system provides a switch or UI control enabling a driver or other emergency personnel to manually disable the digital alerts. For example, if a firetruck has arrived at the scene of a fire which has already gone out, the driver or other emergency personnel can utilize the controls to manually turn off digital alerts or terminate existing digital alerts which have already been sent out due to the minimal risk or lack of need for digital alerts in the current situation. This provides greater flexibility and control over digital alerts for users.

Alternatively, or in addition to the other examples described herein, examples include any combination of the following:
  wherein the network device comprises a cellular chip;
  wherein the notification is transmitted to the remote computing device via a cellular network;
  provide the notification to the remote computing device responsive to determination the emergency vehicle is in motion;
  wherein the notification is withheld in response to a determination the emergency vehicle is stationary;
  generate a recommended action to be taken by at least one vehicle within the predetermined range of the emergency vehicle;
  transmit the notification, including the recommended action, to a computing device associated with the at least one vehicle, wherein the digital alert includes the recommended action;

transmit the notification to a cloud server associated with a primary recipient;
wherein the cloud server provides the digital alert to a plurality of computing devices associated with a plurality of secondary recipients;
update a navigation application associated with the user interface device;
wherein the navigation application displays the current location of the emergency vehicle to a user associated with the recipient vehicle within the predetermined range of the current location of the emergency vehicle;
detect de-activation of the smart siren device, wherein the smart siren device is turned off;
generate an update notification indicating resolution of an emergency event associated with the emergency vehicle;
transmit the updated notification to the remote computing device;
detecting a change in activation state of a smart siren device to from an un-activated state to an activated state, wherein the smart siren device emits an audible alert sound when the smart siren device is in the activated state;
determining whether the emergency vehicle is in motion;
generating a notification identifying a current location of the emergency vehicle responsive to determining the emergency vehicle is in motion and the smart siren device is in the activated state, the notification comprising notification data;
providing the notification to a selected recipient via a network device of the smart siren device;
wherein a digital alert is generated using the notification data, and wherein the digital alert is presented via a user interface device associated with a recipient vehicle within a predetermined range of the emergency vehicle, the digital alert comprising the current location of the emergency vehicle;
generating a recommended action to be taken by vehicles within the predetermined range of the emergency vehicle;
wherein the recommended action is included in the notification provided to the selected recipient;
identifying a recipient computing device located within a predetermined range of the smart siren device;
transmitting the notification to the recipient computing device, wherein the recipient computing device generates the digital alert on the user interface device of the recipient computing device;
generating a first notification identifying a first recommended action associated with a first audible alert type of the smart siren device;
generating a second notification identifying a second recommended action associated with a second audible alert type of the smart siren device;
wherein the first recommended action is a different recommended action than the second recommended action;
providing a first digital alert to a first user associated with a first vehicle within a first range of the emergency vehicle;
providing a second digital alert to a second user associated with a second vehicle within a second range of the emergency vehicle;
providing the notification to the selected recipient responsive to determination a digital alert service is activated;
wherein the notification is withheld responsive to de-activation of the digital alert service;
updating a navigation application associated with the user interface device;
wherein the navigation application displays the current location of the emergency vehicle to a user associated with the recipient vehicle within the predetermined range of the current location of the emergency vehicle;
detect a change in activation state of a smart siren device associated with an emergency vehicle from a de-activated state to an activated state;
determine whether the emergency vehicle is in motion;
generate a notification identifying a current location of the emergency vehicle responsive to determining the emergency vehicle is in motion and the siren device is in the activated state;
provide the notification to a computing device associated with a recipient user, wherein the computing device generates a digital alert based on the notification, the digital alert presented to the recipient user via a user interface device associated with the computing device, the digital alert including the current location of the emergency vehicle;
generate a first notification identifying a first recommended action associated with a first audible alert type of the smart siren device;
generate a second notification identifying a second recommended action associated with a second audible alert type of the smart siren device;
identify a first vehicle within a predetermined range of the emergency vehicle;
provide the notification to a computing device associated with the vehicle within the predetermined range;
determine whether a digital alert service is activated; and provide the notification to a remote computing device responsive to determination the digital alert service is activated, wherein notifications are withheld responsive to de-activation of the digital alert service;
identify a type of emergency; and generate a recommended action based on the type of emergency and the current location of the emergency vehicle, wherein the digital alert includes the recommended action; and
display the current location of the emergency vehicle within a map generated by a navigation application, the map identifying a direction of travel of the emergency vehicle.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11 and FIG. 12 can be performed by other elements in FIG. 1, FIG. 2, FIG. 3, FIG. 4, FIG. 5, FIG. 6, FIG. 7, FIG. 8, FIG. 9, FIG. 10, FIG. 11 and FIG. 12, or an entity (e.g., processor, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11 and FIG. 12.

In some examples, the operations illustrated in FIG. 13 and FIG. 14 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of providing digital alerts associated with activation of emergency sirens on an emergency vehicle, the method comprising detecting a change in activation state of a surface mounted siren device to an activated state; determining whether the emergency vehicle is in motion; generating a notification identifying a current location of the emergency vehicle responsive to determining the emergency vehicle is in motion and the surface mounted siren device is in the activated state; and providing the notification to a selected recipient via a network device of the surface mounted siren device.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent can take the form of opt-in consent or opt-out consent.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions, or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for providing digital alerts associated with smart siren device activation. For example, the elements illustrated in FIG. 1, FIG. 2, FIG. 3, FIG. 4, FIG. 5, FIG. 6, FIG. 7, FIG. 8, FIG. 9, FIG. 10, FIG. 11 and FIG. 12, such as when encoded to perform the operations illustrated in FIG. 13 and FIG. 14, constitute exemplary means for detecting a change in activation state of a surface mounted siren device to an activated state; exemplary means for determining whether the emergency vehicle is in motion; exemplary means for generating a notification identifying a current location of the emergency vehicle responsive to determining the emergency vehicle is in motion and the surface mounted siren device is in the activated state; and exemplary means for providing the notification to a selected recipient via a network device of the surface mounted siren device, wherein a digital alert is displayed on a user interface device associated with a second vehicle within a predetermined range of the emergency vehicle, the digital alert comprising the current location of the emergency vehicle.

Other non-limiting examples provide one or more computer storage devices having a first computer-executable instructions stored thereon for providing smart siren device activation digital alerts. When executed by a computer, the computer performs operations including detect a change of an activation state of the siren device from a de-activated state to an activated state; generate a notification identifying a current location of the emergency vehicle and a recommended action to be taken by any vehicles within a predetermined range of the emergency vehicle responsive to detecting the change in the activation state of the siren device; and provide the notification to a remote computing device via the network device of the siren device, wherein a digital alert is displayed on a user interface device associated with a second vehicle within the predetermined range of the emergency vehicle, the digital alert comprising the current location of the emergency vehicle and the recommended action.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for providing digital alerts associated with emergency siren activations, the system comprising:
   a smart siren device associated with an emergency vehicle, the smart siren device comprising a set of speakers and a siren controller device, the siren controller device comprising:
      a network device;
      a processor; and
      a memory communicatively coupled to the processor, the memory comprising computer-readable instructions configured to, with the processor, implement a digital alert manager, to cause the processor to:
      detect a change of an activation state of the smart siren device from a de-activated state to an activated state, wherein the smart siren device emits a set of sounds associated with a selected audible alert type when the smart siren device is in the activated state;
      generate a notification identifying a current location of the emergency vehicle responsive to detecting the change in the activation state of the smart siren device, the notification comprising notification data including the current location of the emergency vehicle;
      provide the notification to a remote computing device via the network device responsive to a determination the emergency vehicle is in motion, wherein the notification is withheld in response to a determination that the emergency vehicle is stationary; and
      provide a digital alert on a user interface device associated with a recipient vehicle within a predetermined range of the emergency vehicle using the notification data, the digital alert comprising the current location of the emergency vehicle.

2. The system of claim 1, wherein the network device comprises a cellular chip, wherein the notification is transmitted to the remote computing device via a cellular network.

3. The system of claim 1, wherein the instructions are further operative to:

generate a recommended action to be taken by at least one vehicle within the predetermined range of the emergency vehicle; and transmit the notification, including the recommended action, to a computing device associated with the at least one vehicle, wherein the digital alert includes the recommended action.

4. The system of claim 1, wherein the instructions are further operative to:

transmit the notification to a cloud server associated with a primary recipient, wherein the cloud server provides the digital alert to a plurality of computing devices associated with a plurality of secondary recipients.

5. The system of claim 1, wherein the instructions are further operative to:

update a navigation application associated with the user interface device, wherein the navigation application displays the current location of the emergency vehicle to a user associated with the recipient vehicle within the predetermined range of the current location of the emergency vehicle.

6. The system of claim 1, wherein the instructions are further operative to:

detect de-activation of the smart siren device, wherein the smart siren device is turned off;

generate an updated notification indicating resolution of an emergency event associated with the emergency vehicle; and transmit the updated notification to the remote computing device.

7. A method for providing digital alerts associated with emergency siren activations, the method comprising:

detecting a change in activation state of a smart siren device from an un-activated state to an activated state, wherein the smart siren device emits an audible alert sound when the smart siren device is in the activated state;

determining whether an emergency vehicle is in motion;

generating a notification identifying a current location of the emergency vehicle responsive to determining the emergency vehicle is in motion and the smart siren device is in the activated state, the notification comprising notification data;

providing the notification to a selected recipient via a network device of the smart siren device in response to the determination the emergency vehicle is in motion, wherein the notification is withheld in response to a determination that the emergency vehicle is stationary, wherein a digital alert is generated using the notification data; and presenting the digital alert via a user interface device associated with a recipient vehicle within a predetermined range of the emergency vehicle, the digital alert comprising the current location of the emergency vehicle.

8. The method of claim 7, further comprising:

generating a recommended action to be taken by vehicles within the predetermined range of the emergency vehicle, wherein the recommended action is included in the notification provided to the selected recipient.

9. The method of claim 7, wherein the selected recipient is a cloud server, and further comprising:

identifying a recipient computing device located within a predetermined range of the smart siren device; and transmitting the notification to the recipient computing device, wherein the recipient computing device generates the digital alert on the user interface device of the recipient computing device.

10. The method of claim 7, further comprising:

generating a first notification identifying a first recommended action associated with a first audible alert type of the smart siren device; and generating a second notification identifying a second recommended action associated with a second audible alert type of the smart siren device, wherein the first recommended action is a different recommended action than the second recommended action.

11. The method of claim 7, further comprising:

providing a first digital alert to a first user associated with a first vehicle within a first range of the emergency vehicle; and providing a second digital alert to a second user associated with a second vehicle within a second range of the emergency vehicle.

12. The method of claim 7, further comprising:

providing the notification to the selected recipient responsive to determination a digital alert service is activated, wherein the notification is withheld responsive to de-activation of the digital alert service.

13. The method of claim 7, further comprising:

updating a navigation application associated with the user interface device, wherein the navigation application displays the current location of the emergency vehicle to a user associated with the recipient vehicle within the predetermined range of the current location of the emergency vehicle.

14. One or more computer storage devices having computer-executable instructions stored thereon, which, upon execution by a computer, cause the computer to perform operations comprising:

detect a change in activation state of a smart siren device associated with an emergency vehicle from a de-activated state to an activated state;

determine whether the emergency vehicle is in motion;

generate a notification identifying a current location of the emergency vehicle responsive to determining the emergency vehicle is in motion and the siren smart device is in the activated state; and provide the notification to a computing device associated with a recipient user responsive to the determination that the emergency vehicle is in motion, wherein the notification is withheld in response to a determination the emergency vehicle is stationary, wherein the computing device utilizes the notification data of the notification to generate a digital alert presented to the recipient user via a user interface device associated with the computing device, the digital alert including the current location of the emergency vehicle.

15. The one or more computer storage devices of claim 14, wherein the operations further comprise:

generate a first notification identifying a first recommended action associated with a first audible alert type of the smart siren device; and generate a second notification identifying a second recommended action associated with a second audible alert type of the smart siren device.

16. The one or more computer storage devices of claim 14, wherein the operations further comprise:

identify a first vehicle within a predetermined range of the emergency vehicle; and provide the notification to a computing device associated with the first vehicle within the predetermined range.

17. The one or more computer storage devices of claim 14, wherein the operations further comprise:
  determine whether a digital alert service is activated; and
  provide the notification to a remote computing device responsive to determination the digital alert service is activated, wherein notifications are withheld responsive to de-activation of the digital alert service.

18. The one or more computer storage devices of claim 14, wherein the operations further comprise:
  identify a type of emergency; and
  generate a recommended action based on the type of emergency and the current location of the emergency vehicle, wherein the digital alert includes the recommended action.

19. The one or more computer storage devices of claim 14, wherein the operations further comprise:
  display the current location of the emergency vehicle within a map generated by a navigation application, the map identifying a direction of travel of the emergency vehicle.

* * * * *